July 14, 1931.   J. H. ROBERTSON   1,813,957
VARIABLE FRICTION GEARING
Filed Aug. 20, 1930   3 Sheets-Sheet 2
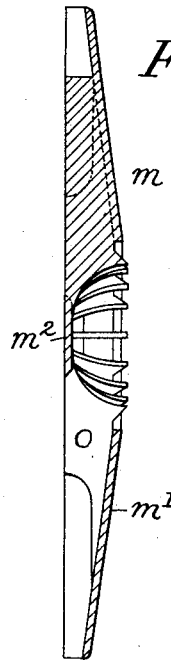
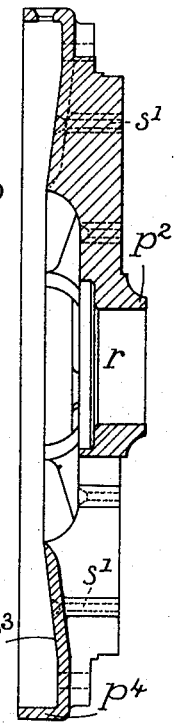
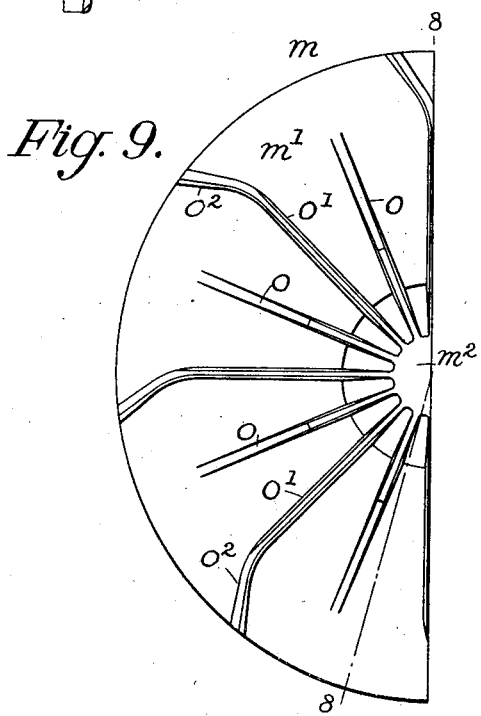
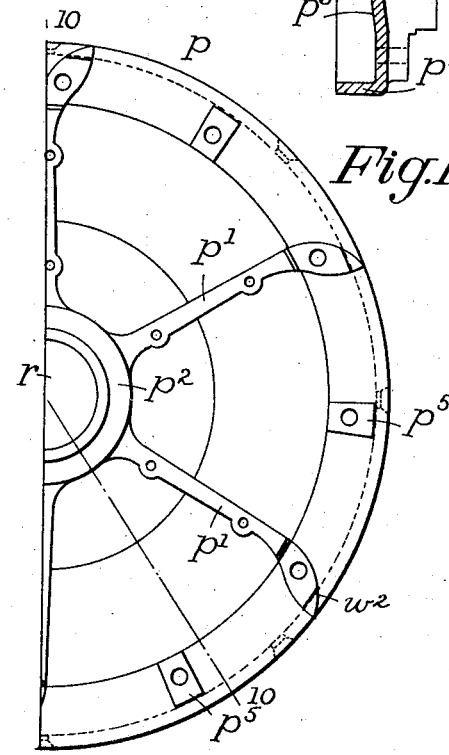

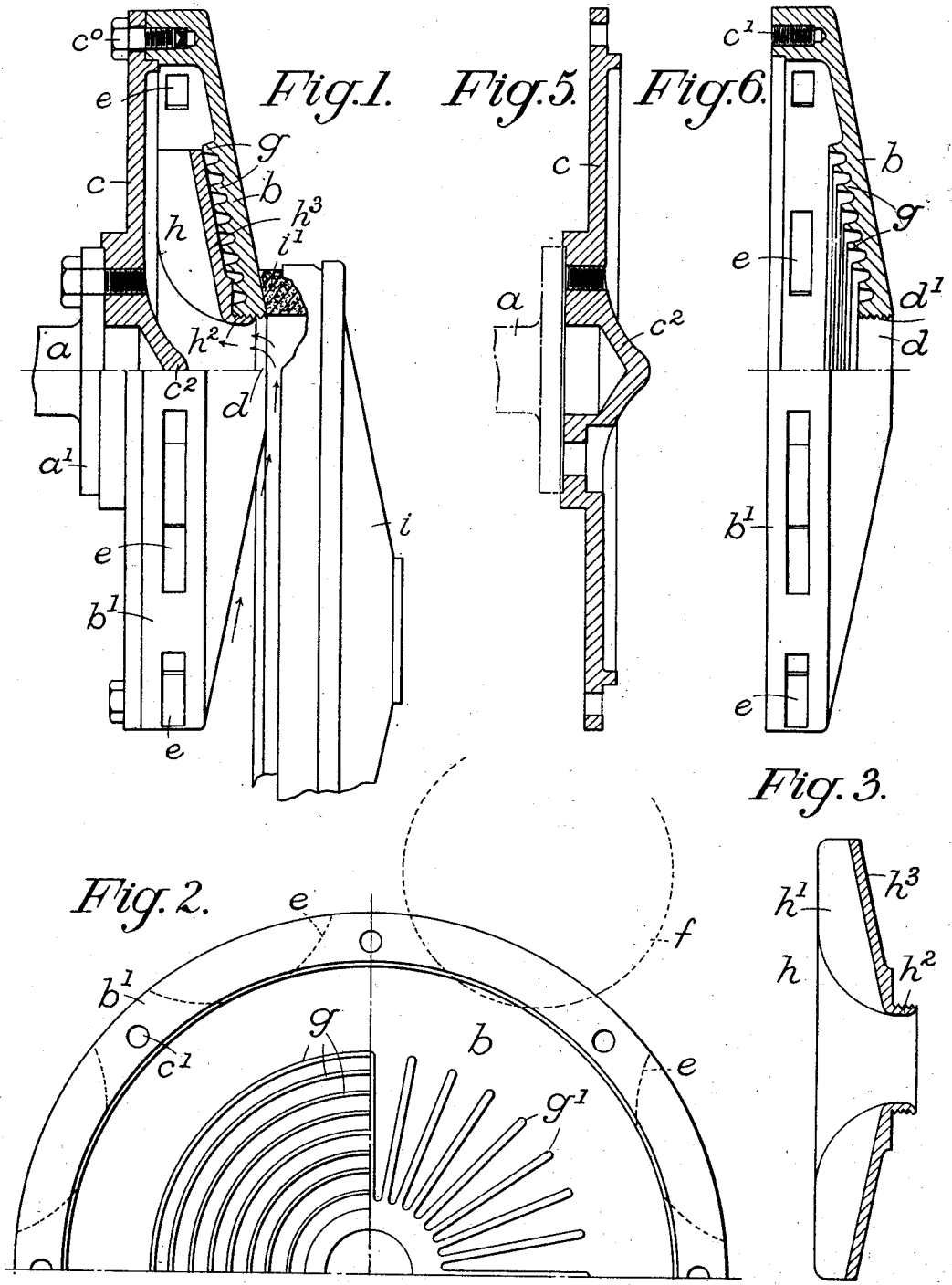

Patented July 14, 1931

1,813,957

UNITED STATES PATENT OFFICE

JOHN HOGG ROBERTSON, OF LONDON, ENGLAND

VARIABLE FRICTION GEARING

Application filed August 20, 1930, Serial No. 476,476, and in Great Britain September 6, 1929.

This invention relates to variable friction gearing and is particularly applicable in connection with a continuously variable friction gearing of the type in which a driven member is adapted to make face contact with a driving member, a direct drive position being provided in which the two members engage coaxially, in the manner of a disc or cone clutch, and a series of indirect drive positions being provided in which one member is displaced laterally to a variable extent so that contact takes place at points (or limited areas) of which the respective radial distances from the axes of the two members are unequal.

The invention has for its main object to prevent heating and distortion of the frictional members under severe operating conditions, such as repeated starting under load or the continuous transmission of the drive through low gear ratios for a considerable length of time.

Another object is to provide means for circulating air through the interior of a frictional member in order to dissipate the heat generated by the operation of the gearing.

A further object is to provide an improved construction in which the air for cooling purposes has free access to the interior of the frictional members so long as they occupy a relatively eccentric position due to the lateral displacement of one member for obtaining an indirect drive.

The invention is hereafter described with reference to the accompanying drawings in which:—

Figure 1 is a part-sectional side elevation of a friction gearing embodying the present invention.

Figure 2 is a rear half-elevation of the driving member, the left side illustrating the use of concentric cooling ribs and the right side illustrating the use of radial ribs.

Figure 3 is a section and Figure 4 a half elevation of the air-impeller detached from the driving member.

Figures 5 and 6 are sectional edge views of the back plate and driving member respectively.

Figure 8 is a section and Figure 9 a rear-half-elevation of the air impeller detached from the driving member, the section being taken on the line 8—8 of Figure 9.

Figure 10 is a section and Figure 11 a half-elevation of the wheel supporting the friction ring which constitutes the driven member; the section seen in Figure 10 is taken on the line 10—10 of Figure 11.

Figure 7:
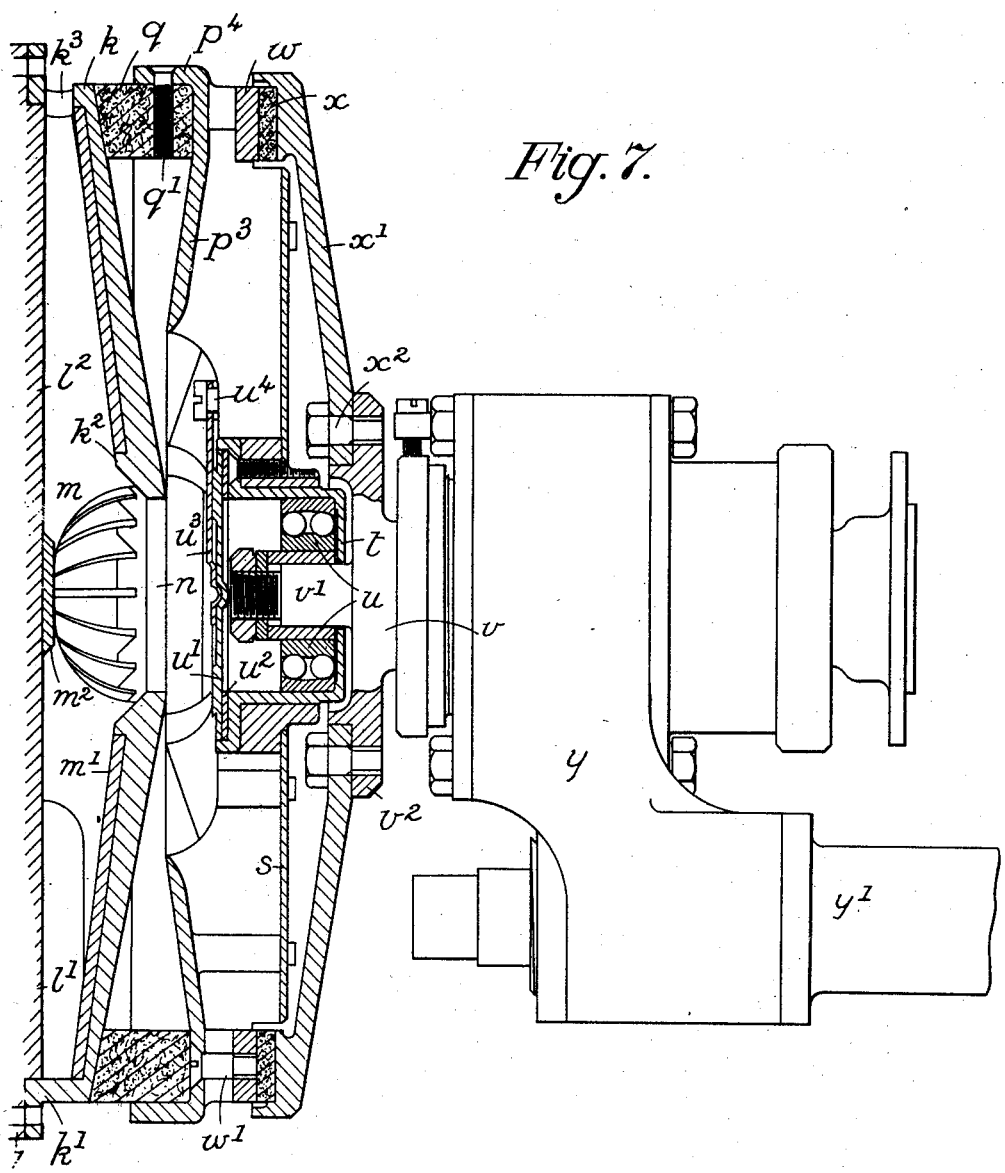
Figure 7 is a part sectional side elevation of another construction of friction gearing embodying the invention.

Referring to Figures 1 to 6, the driving shaft $a$ is secured to the driving member of the friction gearing by means of a flange $a^1$ bolted to a back plate $c$ with studs $c^0$ passing through the rim of the back plate and entering holes $c^1$ in the lip or periphery $b^1$ of the driving member. The latter comprises a disc $b$ having its front face coned or dished to co-operate with the laterally displaceable driven member of the gearing which comprises a rotatable wheel $i$ carrying an annular ring $i^1$ of friction material and supported upon a radius arm $j$, as described in my United States Patent No. 1,772,593, granted August 12, 1930.

At the center of the disc $b$, a small circular area with which the driven member does not engage in friction gearings of this type, is apertured as shown so as to provide an opening $d$ for admitting air into the compartment formed by the disc and the back plate. It will be understood that when the friction gearing is in the direct drive position, with the two members $b$ $i$ coaxial, the friction ring $i^1$ makes contact wth the cone $b$ all round the circumference, so that the air has no free access to the opening $d$; but in all the various positions of relative displacement giving the series of indirect drives, the air has free access from the exterior to the opening $d$ as indicated by the arrows in Figure 1.

The peripheral lip $b^1$ of the disc is also apertured by the formation of a number of slots $e$ equally spaced apart intermediately of the stud-holes $c^1$; these slots may be formed by milling for example with a cylindrical cutter as indicated in dotted lines at $f$ in Figure 2. Thus the air entering the casing at $d$ can find its way out through the slots $e$, being preferably discharged by centrifugal force assisted by mechanical impulsion, as hereafter described.

The rear face of the disc $b$ is formed with ribs $g$ which ensure its effective cooling by the circulating air. These ribs $g$ are shown in the left half of Figure 2 as being circular and concentric with the disc, but if preferred they may be placed radially as shown at $g^1$ in the right half of the figure. The ribs $g$ or $g^1$ also serve to stiffen the relatively thin disc $b$ so that even when the pressure of the driven member is concentrated at a point or line contact in the positions of indirect drive, the disc retains its true conical shape and no irregularity occurs in the transmission of torque, as might happen with a thin disc if distorted by heating or pressure.

Inside the compartment formed by the disc $b$ and the back plate $c$, I provide a mechanical impeller $h$, shown separately in Figures 3 and 4, with volute or spiral vanes $h^1$, the boss $h^2$ of this impeller being screwed externally so that it can be fitted to the disc $b$ by screwing into the central opening $d$, which is correspondingly screw-threaded for this purpose as indicated at $d^1$. The vane supporting web $h^3$ contacts with the ribs $g$ (or $g^1$) when in place, so that the air current produces an effective cooling of the disc, more especially by way of the vanes $h^1$ in thermo-conductive relation therewith. The back plate $c$ is provided with a central boss $c^2$ forming a deflector for the air entering through the eye or hollow boss of the impeller.

Figures 7 to 11 illustrate a modified arrangement in which both the driving and the driven members of the gearing are provided with means for the circulation of cooling air.

The driving member $k$ consists of a coned disc having a peripheral flange $k^1$ by which it is bolted upon an annular seating $l^1$ on the front face of the engine flywheel $l$, the latter forming the back plate of a compartment for the flow of air behind the disc member $k$. An air-impeller $m$ is held tightly between the member $k$ and the flywheel $l$, with its annular web $m^1$ fitting closely against the inner face of the cone inside the flange $k^1$ and around a circular lip $k^2$ which surrounds the air inlet opening $n$ at the center of the member $k$. Upon the back of the web $m^1$ are formed two alternating series of ribs $o$ $o^1$ respectively which are connected together on the other side by a disc $m^2$ abutting against the front face $l^2$ of the flywheel and also acting as a deflector for the incoming air from the opening $n$, where a substantially hemi-spherical space exists at the inner ends of the ribs $o$ $o^1$. The ribs $o$ are comparatively short and formed radially, with their outer ends merging into the rear face of the web $m^1$. The ribs $o^1$ however extend out to the periphery of the web $m^1$, their outer ends $o^2$ being curved or swept backwards, against the direction of rotation, so as to act as impeller vanes for the air leaving the interior compartment by way of the slots $k^3$ at the flanged periphery of the member $k$.

The driven member comprises a flanged wheel $p$ supporting a friction ring $q$ for engagement with the driving member $k$, a plurality of vane-forming arms $p^1$ connecting the flanged periphery of the wheel to a central hub $p^2$, and an annular web $p^3$; the latter is disposed on the side facing the driving member $k$ and its open center provides an air inlet opening at $r$, whereby the arms $p^1$ acting as impeller vanes can circulate air drawn from the central space when the driven member $p$ is in an eccentric or low-gear position relatively to the driving member. This air passes through the hollow interior of the driven member and outwardly through peripheral discharge openings.

In the construction illustrated, the wheel $p$ is formed with a cylindrical flange $p^4$ within which the friction ring $q$ is secured by means such as rivets $q^1$ passing radially through the flange; the surface against which the ring $q$ rests laterally is continued towards the center by the web $p^3$, which is preferably cast integral with the arms $p^1$ and flange $p^4$. The wheel is also provided around its periphery, on the face remote from the driving member $k$, with interspaced blocks $p^5$ alternating with the curved extremities of the vane-forming arms $p^1$; the air discharge openings extend peripherally between the alternate blocks $p^5$ and vane-extremities, their width corresponding to the height of the blocks. As seen in Figure 11, the curved extremities of the arms $p^1$ are shaped to give a smooth exit for the air, while assisting in its discharge.

A flat annular cover plate $s$ is secured on one face of the wheel $p$ by screws $s^1$ engaged in lugs or bosses upon the arms $p^1$ so that the body of the impeller is wholly enclosed on the side remote from the driving disc. The hub $p^2$ is shown fitted with a liner cup $t$ inside which is mounted a self-aligning ball bearing $u$ carried by the spigot end $v^1$ of the driven shaft $v$. This bearing is enclosed in order to exclude dust brought in by the air current, for example by a cover plate $u^1$ resting against a felt washer $u^2$ at the open end of the cup $t$, the cover plate being detachably held in position by a pivoted spring blade $u^3$ secured by a screw $u^4$.

The driven member $p$ is provided with an annular wearing plate $w$ adapted to contact with a clutch facing $x$ upon a spider $x^1$ secured by bolts $x^2$ to a flange $v^2$ on the driven shaft, the clutch surfaces $w$ $x$ being intended to take up any slip at starting so as to obviate wear upon the rolling surfaces of the friction members. The plate $w$ is held against the spaced blocks $p^5$ and the alternating extremities of the arms $p^1$ by countersunk screws $w^1$ passing through the periphery of the wheel $p$ and through the said blocks and vane-extremities into the thickness of the plate $w$. In order to center the wearing plate upon the wheel, the arms $p^1$ may be stepped or reduced in width as indicated at $w^2$ in Figure 11, the distance between the plate $w$ and the web $p^3$ representing the width of the peripheral air discharge openings.

The driven shaft $v$ is rotatably mounted in a radius arm $y$ which is adapted to swing about the pivotal axis $y^1$ for the purpose of varying the relative position of the friction gearing members by lateral displacement of the driven member $p$; the swinging movement of the radius arm may be controlled by any suitable means, for example, as described in my pending patent application Serial No. 291,122.

What I claim is:—

1. In a variable friction gearing, comprising two revoluble members adapted for direct-drive engagement in coaxial position and for indirect drive engagement in relatively eccentric position, one of said members having an air inlet opening adjacent to its axis, a plurality of air discharge openings adjacent to its periphery, and its interior open for passage of air from said inlet to said discharge openings, said inlet opening being freely accessible in the eccentric position of said members.

2. In a variable friction gearing, a revoluble gearing member having an air inlet opening adjacent to its axis, and a plurality of air discharge openings adjacent to its periphery, and air impulsion means carried by said member, said air impulsion means comprising a plurality of vanes and an annular web integral with said vanes, said web being in thermal contact with the power-transmitting surface of said gearing member.

3. In a variable friction gearing a revoluble gearing member comprising a coned disc having an air inlet opening adjacent to its center, a peripheral flange upon said disc, said flange having a plurality of apertures for the discharge of air, and an air-impeller, said air-impeller comprising an annular web in thermal contact with the rear face of said coned disc and a plurality of vane-forming arms upon the other side of said web and being driven together with said member by means of said flange.

4. In a variable friction gearing of the type described, a driving member comprising a coned disc having an air inlet opening adjacent to its center, a peripheral flange upon said disc, a back plate, means for securing said flange to said back plate, and an air-impeller enclosed between said disc and said back plate, said air-impeller comprising an annular web in contact with the rear face of said disc and a plurality of vane-forming arms integral with said web and contacting with said back plate, said air-impeller receiving air from said inlet opening at the inner ends of said vane-forming arms and discharging the air through a plurality of openings in said peripheral flange.

In testimony whereof I have affixed my signature.

JOHN HOGG ROBERTSON.